United States Patent
Yamane (10) Patent No.: US 8,805,584 B2
(45) Date of Patent: Aug. 12, 2014

(54) KINEMATIC AND DYNAMIC CALIBRATION METHODS FOR LEGGED ROBOTS WITH FORCE-CONTROLLED JOINTS

(75) Inventor: Katsu Yamane, Township of O'Hara, PA (US)

(73) Assignee: Disney Enterprises, Inc, Burbank, CA (US)

( * ) Notice: Subject to any disclaimer, the term of this patent is extended or adjusted under 35 U.S.C. 154(b) by 482 days.

(21) Appl. No.: 13/302,728

(22) Filed: Nov. 22, 2011

(65) Prior Publication Data
US 2013/0131865 A1    May 23, 2013

(51) Int. Cl.
G05B 19/04    (2006.01)
B25J 9/16    (2006.01)

(52) U.S. Cl.
CPC ..................................... B25J 9/1692 (2013.01)
USPC ............ 700/254; 700/245; 700/250; 700/253

(58) Field of Classification Search
CPC ............................... G06N 3/008; B25J 9/1692
USPC .......... 700/245, 247, 249, 250, 253, 254, 261
See application file for complete search history.

(56) References Cited

PUBLICATIONS

Ayusawa et al., Identification of Humanoid Robots Dynamics Using Floating-base Motion Dynamics, 2008, IEEE.*
Nash, Compact Numerical Methods for Computers, 1979, IOP Publishing.*
Stephens, Push Recovery Control for Force-Controlled Humanoid Robots, Aug. 2011, CMU.*
Hollerbach et al., Model Identification, 2008, Springer Handbook of Robotics.*
Dimitrov et al., On the implementation of model predictive control for on-line walking pattern generation, 2008, IEEE.*

* cited by examiner

*Primary Examiner* — Thomas G Black
*Assistant Examiner* — Sara Nelson
(74) *Attorney, Agent, or Firm* — Marsh Fischmann & Breyfogle LLP; Kent A. Lembke (57) ABSTRACT

A method for calibrating a force-controlled, biped humanoid robot. The method includes selecting a kinematic constraint for the humanoid robot such as maintain the two feet in flat contact with the floor. The method includes moving the humanoid robot into a plurality of poses while enforcing the kinematic constraint. The method includes, during the moving or posing step, collecting angle measurements for a set of joints of the humanoid robot and then, with a processor, running a kinematic calibration module to determine angular offsets for the robot joints to allow determination of joint torques by a robot controller with truer angular orientations. The method includes, during the moving step, collecting relative orientation data from an inertial movement unit (IMU) mounted on the pelvis link, and the angular offsets are determined using relative orientation data. All data is collected from devices on the robot, and no external data collection is required.

19 Claims, 6 Drawing Sheets

KINEMATIC AND DYNAMIC CALIBRATION METHODS FOR LEGGED ROBOTS WITH FORCE-CONTROLLED JOINTS

BACKGROUND

1. Field of the Description

The present description relates, in general, to legged robots (e.g., biped humanoid robots or other legged robots such as quadrupeds) that may be implemented as floating-base humanoid robots (e.g., with no link or attachment to a support) and to control of force-controlled joints of such robots. More particularly, the present description relates to methods for controlling floating-base humanoid robots using strict contact force constraints (and to robots operating with a controller implementing such control methods).

2. Relevant Background

A biped humanoid robot is a robot with an appearance based on that of the human body. Humanoid robots have been designed for providing interaction with various environments such as tools and machines that were made for humans and often are adapted for safely and effectively interacting with human beings. In general, humanoid robots have a torso with a head, two arms, and two legs each with some form of foot such that the robot can walk on planar surfaces, climb steps, and so on (e.g., these humanoid robots are "bipeds" as are humans). Humanoid robots may be formed with many rigid links that are interconnected by joints that are operated or positioned by applying a force or torque to each joint to move and position a robot. Similarly, other legged robots such as those with three, four, or more legs also may walk utilizing force-controlled movement of their legs.

In order to interact with human environments, humanoid robots require safe and compliant control of the force-controlled joints. In this regard, a controller is provided for each robot that has to be programmed to determine desired motions and output forces (contact forces) and, in response, to output joint torques to effectively control movement and positioning of the humanoid robot. However, it has often proven difficult to achieve desired results with force-controlled robots because while performing a task in a complex environment the robot may encounter uneven ground or even steps, static and dynamic obstacles, and even humans. The robot has to continue to be balanced as it stands in one location and also as it steps and moves within the environment.

A number of useful techniques have been developed for controlling humanoid robots including use of virtual model control (VMC), use of dynamic balance force control (DBFC), or the like to achieve contact force control. Regardless of the specific control techniques implemented by the robot controller, particular data that may be provided by sensors or be calculated has to be accurate for adequate control to be achieved. For example, compared with traditional manipulators, it has proven to be an ongoing challenge to identify or determine kinematic and dynamic parameters of floating-base humanoid robots. The difficulty exists in part because it is problematic to obtain a wide variety of poses and motions while maintaining balance. In addition, parameter identification or determination algorithms often have required external measurement, and this forces robotic control systems to include additional sensors in the environment (i.e., outside or external to the robot itself).

As one particular example with regard to kinematic parameters, a robot may include a sensor at each joint that is used to provide input to the controller for identifying or determining joint angles, and these joint angles are kinematic parameters used to further control and/or position the robot through movement of its joints. In practice, the joint sensors may move or rotate from their original positions due to movement of the joints and applied forces. As a result, some of the sensors are providing data that indicates a measured joint angle that varies from the actual joint angle for the robot, and, without correction, the robot will be improperly controlled or positioned, which can result in failure to complete a task and even loss of balance.

Calibration can be used to address these problems with the identification of kinematic and dynamic parameters used in robot control, but many existing calibration methods are difficult to implement and/or do not wholly resolve these control problems. Most kinematic calibration methods, such as those used to correct for inaccurate joint sensors, use external position measurements of some feature points on the robot. This may include providing markers on the robot and using external motion sensors to pick up the marker positions to determine global measurements and local measurement from the joint sensors. Offsets are calculated for each sensor to allow the controller to more accurately determine true joint angles. As can be seen, this requires use of additional external devices (motion sensors) and measurements, and the kinematic calibration is time consuming and tedious especially since it may have to be periodically repeated to account for further movement of the sensors.

Similarly, dynamic calibration may be desirable to more accurately identify inertial parameters such as mass and moment of inertia of each link for the controller. Existing dynamic calibration methods are often ineffective as it is difficult to move the robot in many different ways and into positions while retaining proper balance. As a result, the input data is often limited, and the limited data collection process makes calculation of inertial parameters a challenge. An exemplary dynamic calibration method involves use of the pseudo-inverse of a coefficient matrix. However, it has proven difficult to get a well-conditioned coefficient matrix such that this calibration method results in physically inconsistent parameters such as a negative mass when the calibration data is not adequately diverse.

Hence, there remains a need for improved methods for calibrating humanoid robots. Preferably, the methods would provide kinematic calibration without the need for external measurements and would provide dynamic calibration with physically consistent inertial parameters.

SUMMARY

The present invention addresses the above problems by providing a calibration method for force-controlled robots (and robots utilizing such methods for enhanced control). The method is suited for use with biped humanoid robots, but it is useful for nearly any legged robot (e.g., a quadruped or the like). The calibration method includes a kinematic calibration technique that allows the joint angle sensor offsets to be estimated or computed using sensors that are usually available on most humanoid robots including an inertial measurement unit (IMU) and a number of joint angle sensors. The kinematic calibration technique or method utilizes a kinematic constraint that is enforced, such as by the environment, instead of using the global position and orientation measurements commonly obtained with external devices and used to estimate offsets. In one example, kinematic calibration included an operator manually moving a humanoid robot by hand while keeping both feet in flat contact with the floor or other horizontal, planar support platform. Experiments showed that use of this kinematic constraint was adequate to allow efficient and accurate computation of the joint angle sensor offsets at all or a subset of the robot's joints.

The calibration method may also include a dynamic calibration method useful for determining inertial parameters such as mass of the links of the robot. Two methods, which are labeled a least-square method and a gradient-based method, are taught herein for computing or identifying inertial parameters of humanoid robots, with these methods supporting easy implementation and robustness against poor excitation data. Ease of implementation is realized by computing the standard inertial parameters rather than the base parameters, a subset of standard inertial parameters that affect the dynamics of the robot and, therefore, are identifiable (as done in prior dynamic calibration processes) Robustness against lack of data is handled by either omitting small singular values of the regressor in the least-square method or by solving an optimization problem using the gradient-based method. Experiments have shown that the least-square method can yield consistent inertial parameters when the condition number threshold is appropriate. The experiments also showed that the gradient-based method gives reasonable results even with ill-conditioned regressors and provides excellent cross-validation results. Further, the gradient-based method can consider inequality constraints to prevent inconsistent inertial parameters.

More particularly, a method is provided for calibrating a legged robot with force-controlled joints. The method includes selecting a kinematic constraint for the robot and then moving the robot into a plurality of poses while enforcing the kinematic constraint. The method also includes, during the moving or posing step, collecting a set of angle measurements for a set of joints of the robot and then, with a processor running a kinematic calibration module, determining an angular offset for each of the joints in the set of joints.

In some embodiments, the method further includes, during the moving step, collecting global orientation data at each of the poses from an inertial movement unit (IMU) mounted on a link of the robot (e.g., the pelvis link). In such cases, the determining of the angular offsets is based on the collected global orientation data. Typically, the angle measurements are provided by a joint angle sensor (e.g., a potentiometer) mounted proximate to each of the joints in the set of joints such that all data is collected from devices provided on the robot and no external data collection is required (e.g., no need for motion sensors or the like).

In some implementations of the method, the angular offsets determining step includes minimizing a cost function that has been defined based on link orientations and the kinematic constraint (e.g., error associated with each). To practice the method, the robot may be a humanoid robot or biped with two legs and two feet (or have more than two legs and corresponding feet), and the kinematic constraint may include maintaining soles of the two feet flat and in contact with a horizontal, planar support surface. Then, the kinematic constraint may further include retaining the two feet in an aligned configuration. For example, the aligned configuration may include parallel positions and fore and aft positions of the two feet (e.g., toe-to-heel).

The calibration may also include computing a set of inertial parameters for the robot (e.g., mass of links). Instead of using the base parameters, the computing may include identifying/determining the standard inertial parameters. Also, the computing of the inertial parameters may include omitting singular values of a regressor below a predefined threshold value when performing a least-square minimizing process or the computing may instead include optimizing using a gradient-based process.

DETAILED DESCRIPTION OF THE PREFERRED EMBODIMENTS

Briefly, practical kinematic and dynamic calibration methods are described for use with force-controlled, biped humanoid robots. The calibration methods may be utilized with nearly any force-controlled robot that is adapted to allow free movement of the robotic joints (such as leg joints) while satisfying a set of constraints. In some embodiments, the constraints include retaining the two feet (or soles) flat against a planar base or floor. No external measurements are required for kinematic calibration. Instead, kinematic calibration is performed utilizing measurements from each joint angle sensor along with measurement/determination of link orientations utilizing data from an inertial measurement unit (IMU). The output or result of the calibration is a set of angular offsets for each joint that may be used by a robot controller (e.g., a model-based controller) to determine the true or actual joint angles, which are then used to generate control signals such as joint torques. Even though input may be limited due to inability to move the robot in different ways (lacking many poses due to balance issues), a dynamic calibration technique is taught for determining inertial parameters (e.g., mass and moment of inertia of each link of the robot). These inertial parameters are fed to the robot controller to set or select joint torques to control movement of the robot. With this brief overview in mind, the following description begins with discussion of an exemplary calibrated humanoid robot and then continues on with specific discussion of kinematic calibration and dynamic calibration.

Figure 1:
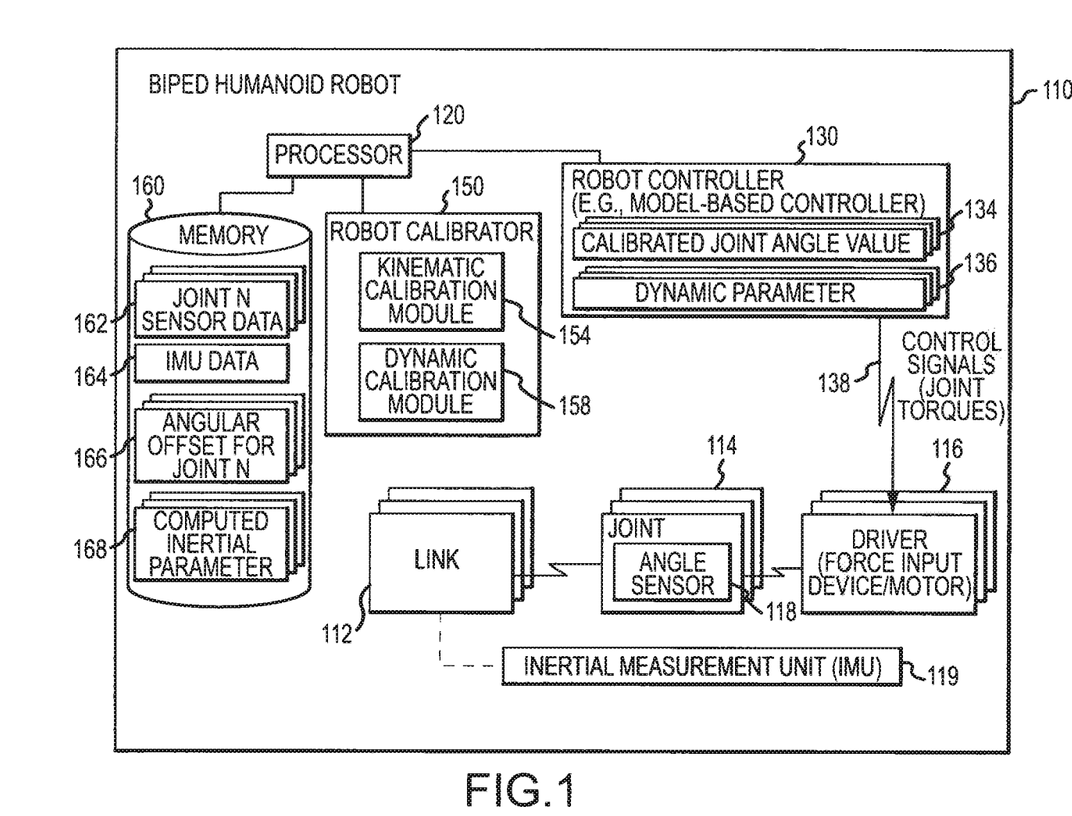
FIG. 1 is a functional block diagram of a biped humanoid robot including software or computer code that may be run periodically to calibrate the robot (e.g., provide calibrated input to a robot controller (e.g., a model-based controller) for use in generating joint torques or other control signals)

FIG. 1 illustrates a functional block diagram of a biped humanoid robot 110 that may be calibrated via use of kinematic calibration and/or dynamic calibration as taught herein. Generally, the calibration methods may be used with nearly any biped humanoid robot 110 that is a force-controlled robot that can be freely moved such as by moving its leg or other joints while satisfying predefined constraints, e.g., feet flat on a floor or other planar support platform. It is desirable to move the robot 110 through a wide enough variety of poses to obtain adequate input from angle sensors to facilitate calibration such as by collecting data (e.g., 20 seconds of data) at 50 to 100 or more different poses.

As shown, the robot 110 includes a number of rigid links 112 that are joined or interconnected and movable with joints 114. The links 112 may be moved and positioned by operating a driver 116 (e.g., a force input device such as motor, an actuator, or the like) to apply a joint torque on the joint 114 in response to control signals (joint torques) received from a robot controller 130. Angle sensors 118 are provided at each joint 114 to output data or measurements indicative of an angle at the joint 114, and the joint angle measurement or sensor data 162 is stored in memory 160 of the robot 110. As will be explained further below, an inertial measurement unit (IMU) 119 is provided on a link 112 of the robot 110 such as on a pelvis link 112, and the IMU 119 provides data 164 also stored in memory 160 that may be used to determine link orientations by a calibration program (such as module 154). The links 112 include a pair of feet with soles, and, during kinematic calibration, these links 112 are constrained to be flat on a floor or other planar support platform (not shown in FIG. 1).

The robot 110 includes a processor or CPU 120 that operates to manage the memory 160 (e.g., store and retrieve data in digital form) and to run one or more programs (non-transitory computer readable medium). For example, the processor 120 runs a robot controller 130 to control operations of the robot 110 including outputting control signals or joint torques 138, such as with model-based control algorithm, based on inputs or input data including calibrated joint angle values 134 (e.g., measured joint angles adjusted by calculated angle offsets 166) and dynamic parameters 136 (e.g., mass and moment of inertia and/or other calculated inertial parameters 168 of each link 112). The form of the robot controller 130 is not limiting of the invention as long as the controller 130 utilizes at least portions of the outputs of the robot calibrator 150 to generate the joint torques 138. In some embodiments, a computer outside of the robot 110 is utilized to generate the angular offsets 166 and computed inertial parameters 168 with a calibrator 150, with this data being communicated (e.g., wirelessly) to the controller 130.

As shown, the processor 120 also runs a software program(s) or computer code that may be provided in non-transitory computer readable medium to provide a robot calibrator 150. The robot calibrator 150 performs two different algorithms or methods via a kinematic calibration module 154 and a dynamic calibration module 158 to provide both kinematic calibration and dynamic calibration. As discussed in detail below, the kinematic calibration module 154 takes the joint sensor data 162 from the angle sensors 118 as input along with the IMU data 164 from the IMU 119, processes this data with a calibration algorithm/method, and outputs angular offsets for each joint 166 that may be used by the calibrator 150 or controller 130 to identify calibrated joint angle values 134 for use in control of the robot 110. The dynamic calibration module 158 may utilize a least-square or a gradient-based minimization technique to assist in determining a regressor and then obtain the inertial parameters 168 that are then output as shown at 136 to the controller 130 for use in generating the control signals 138.

With the general calibration method and a robot 110 using such calibration understood, it may be useful to provide more detail on methods and experimental results regarding the identification of kinematic and dynamic parameters of force-controlled, biped humanoid robots. The following first describes a kinematic calibration method that is useful for estimating joint angle sensor offsets.

The kinematic calibration method is practical in the sense that it only uses joint angle and link orientation sensors (and their output/measured data), which are typically provided on most humanoid robots. Briefly, a basic idea with regard to this method is to solve an optimization problem that represents a kinematic constraint, and this constraint is selected to be one that can be easily enforced such as placing both feet of the robot flat on the floor or other planar support platform. The method identifies or determines joint angle sensor offsets without requiring external measurements (such as motion capture of markers placed on links).

With regard to the dynamic calibration method, two methods are described for identifying physically consistent mass and local center of mass parameters (i.e., inertial parameters used by a robot controller), and this can be achieved even when it is difficult to obtain significant excitation, which is nearly always the case with humanoid robots. Further, experiment results are described that show these two methods for providing dynamic calibration produce good (e.g., acceptable and useful) identification results for inertial parameters even when the regressor has a large condition number. Moreover, the following description shows that gradient-based optimization may perform better than a least-square method in many cases (of the two methods described for use in minimization in the dynamic calibration, gradient-based optimization may often be more useful), and both are robust against poor excitation data.

Prior to turning to the kinematic calibration method, it should be remembered that compared to traditional manipulators is can be difficult to identify or determine kinematic and dynamic parameters of floating-base humanoid robots for a number of reasons. In particular, it is often difficult to get a well-conditioned regressor not only because there are many parameters to identify but also because the robot has to maintain balance throughout the data collection process. Furthermore, global position and orientation measurements may be inaccurate or even unavailable.

The inventor utilized the Carnegie Mellon University's humanoid robot (i.e., a human-sized, biped robot built by Sarcos, a Salt Lake City, Utah-based technology company, and calibrated as described herein) as a test case, but the results are readily applicable to other force-controlled, biped humanoid robots. The test robot had 31 joints in the arms, legs, and trunk. Each joint was actuated by a hydraulic actuator with a force sensor provided and used to measure the actuator force, which then was converted to the joint torque (e.g., by multiplying by the moment arm). Joint angles were measured by angle sensors in the form of potentiometers. Further, during the test of the described calibration methods, a six-axis force sensor was provided at each ankle to measure the ground contact force, and an inertial measurement unit (IMU) was attached to the pelvis link of the test robot.

At this point, a kinematic calibration method for a robot will be discussed, and this method may be used to calibrate robot 110 of FIG. 1 and implemented by kinematic calibration module 154. First, it may be useful to explain the motivation behind developing the kinematic calibration method. The purpose of the kinematic calibration method is to estimate the offsets in joint angle sensors. In humanoid robots, it is known that the sensors such as potentiometers may slide with respect to the link to which they are fixed/mounted.

Sensor movement or shifting occurs when a large torque is applied and may be especially problematic for particular joints including the four (or other number) ankle joints (e.g., flexion/extension and adduction/abduction) that do not have enough space to allow sensor mounting to obtain adequate fixture of the sensor on the link. Identifying or determining the joint angle sensor offsets in the past had required external measurement devices such as motion capture systems. However, setting up such external offset measurement systems is time consuming and tedious especially when recalibration needs to be done frequently for a robot.

The kinematic calibration method described herein may be thought of as implementing an algorithm that can identify the joint angle offsets by only measuring the orientations of one or more links as well as the joint angles with the sensors that may or may not have rotated/moved from the desired mounting location. Link orientations may be measured in a number of ways to practice the calibration method with some embodiments utilizing IMUs to measure link orientations because most humanoid robots are already equipped with IMUs for use in balance control (not for offset estimates). Therefore, the kinematic calibration method does not require external measurements to perform calibration of a robot.

One key aspect of the kinematic calibration method is to move the robot's joints to a number of positions (e.g., randomly move the force-controlled joints that are free to be moved) while the robot is held under one or more kinematic constraints. In one implementation, the kinematic constraints include placing the biped humanoid robot's feet flat on the floor (or another planar support platform). Then, if the joints are back-drivable with reasonable magnitude of external force, joint angle sensor and link orientation data can be collected by moving the robot's joints by hand (manual manipulation).

After collecting a sufficient variation of poses (e.g., 50 to 100 poses or the like), the joint angle offsets are computed by the kinematic calibration module (or software run by a computer/processor) including solving an optimization problem. Nearly any optimization technique can be used with optimization performed with a cost function that decreases as the kinematic constraints are better satisfied. For example, when the feet are in flat contact with the ground/floor, the cost function would be the height variation of the sole vertices for the two feet.

Interestingly, the height of the sole vertices cannot typically be used because the link orientation measurement devices (IMUs) do not give absolute height information. The kinematics calibration method differs from other techniques because the Cartesian position of the root joint is unknown, and, therefore, one cannot assume co-planar contact points across frames. Instead, the kinematic parameters are determined so that multiple contact points in each frame form a single plane. During data collection of the calibration method, the feet are constrained to always be in flat contact with the floor.

Then, the optimization problem can be summarized as follows: (1) inputs or data input (e.g., measurements) provide orientations of one or more links and joint angles at various sample poses; (2) variables or other collected data to solve for or identify include orientation of the root joint at each sample pose and then the joint angle sensor offset of each joint; and (3) the cost function used in the optimization problems includes the orientation error and variation of sole vertex heights.

At this point, it may be useful to discuss one useful formulation or process for providing kinematic calibration. Consider the case where orientation data is obtained for a number of links (M links with M being greater than or equal to one) for a humanoid robot. In the robot, there are a number of rotational joints (N joints) with angles that affect the orientations of the feet of the robot and/or affect the links with IMUs (such as the pelvis joint). In the following description, it is assumed that it is desired to identify or determine the angle offsets of all the joints (for all N joints) of the robot for simplicity of representation, but some embodiments may determine offsets for a smaller subset as it is trivial to exclude some of the joints from offset determination while using their measurements.

For example, it may be assumed that K sample poses are utilized during data collection with each pose meeting the predefined kinematic constraint (e.g., flat feet). The measurements available for the k-th sample are the orientation data from the IMUs, $\hat{R}_k^m$ (m=1, 2, ..., M), and joint angles, $\hat{\theta}_k \in R^N$. The parameters to be identified or determined are the joint offsets, $\Delta\theta$, and the root orientation at each sample, $q_k$.

By solving the optimization problem, the root orientation $(q_1, q_2, \ldots, q_K)$ and the joint offset, $\Delta\theta$, that minimize the cost function, Z, are obtained. The cost function, Z, may be chosen as:

$$Z = \frac{1}{2} \sum_k (L_k + C_k) \qquad \text{Eq. (1)}$$

where $L_k$ and $C_k$ represent the link orientation error and constraint error, respectively, at the k-th sample. Each term of this cost function are described in more detail below.

The first term, $L_k$, is computed by:

$$L_K = \Sigma_m \Sigma_i (p_i^m - \hat{p}_i^m)^T (p_i^m - \hat{p}_i^m) \qquad \text{Eq. (2)}$$

$$p_i^m = R^m(q_k, \hat{\theta}_k + \Delta\theta) s_i \qquad \text{Eq. (3)}$$

$$\hat{p}_i^m = \hat{R}_k^m s_i \qquad \text{Eq. (4)}$$

where $R^m(*,*)$ denotes the forward kinematics function used to compute the orientation of the m-th link with IMU from root orientation and joint angles. The orientation error may be evaluated by the squared position error of the predefined three points fixed to each link with an orientation measurement and by denoting their relative position by $S_i$ (i=1, 2, 3). For example, $S_i$ can be chosen as $(d,0,0)^T$, $(0,d,0)^T$, and $(0,0,d)^T$, where d is a user-defined constant. Using a larger constant, d, corresponds to using larger weight for the first term, $L_k$, because the position error will be larger for the same orientation error.

The second term, $C_k$, represents the kinematic constraint enforced during the data collection. If, for example, the feet of the robot are supposed to be in flat contact with a horizontal floor or other support platform, the second term, $C_k$, associated with the kinematic constraint can be defined as:

$$C_k = \sigma_z^2(q_k, \hat{\theta}_k + \Delta\theta) \qquad \text{Eq. (5)}$$

where $\sigma_z^2(*,*)$ is the function used to compute the variation of the heights of the sole vertices obtained from the given root orientation and joint angles. The sole vertices may, for example, be chosen to be the four corners of each sole. In a typical implementation, the conjugate gradient method is applied to obtain the calibration solution. The initial values for the joint offsets, $\Delta\theta$, are set to zero, and the initial root orientation, $q_k$, is determined by taking the average of root orientations computed using all IMU measurements individually.

Figure 2:
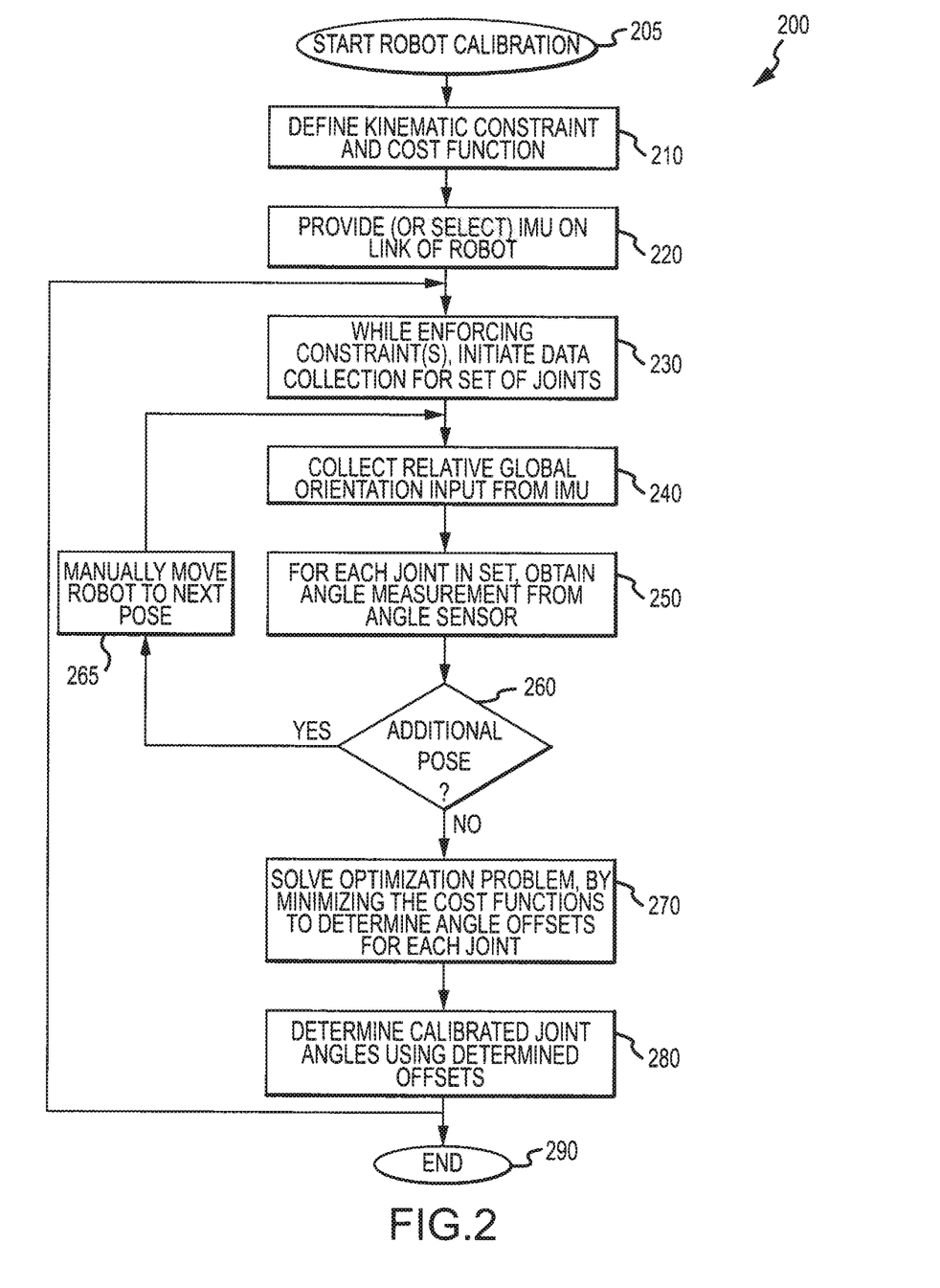
FIG. 2 is a flow diagram illustrating an exemplary calibration method for use with a force-controlled humanoid robot to provide kinematic calibration and enhanced controls.

FIG. 2 illustrates a robot calibration method 200 that may be performed on a force-controlled humanoid robot to provide calibrated joint angles at all or a subset of the robot's joints. The method 200 starts at 205 such as by selecting a robot for calibration and providing a calibration computer running a kinematic calibration module or programming the robot to include such a module/code. At 210, the method 200 continues with defining a kinematic constraint and cost function to use in the calibration. As mentioned above, it is useful in some cases for the kinematic constraint to be that the robot be posed in a manner that its two feet (soles) remain in contact with a flat surface (e.g., a horizontal floor or platform). A cost function is also defined for use in calculating offsets, and the cost function may provide orientation error and variation of sole vertex heights (e.g., when the constraint is chosen to be keeping the feet or soles of the feet of the robot flat).

At 220, the method 200 continues with providing an IMU at one more links of the robot (or if an IMU is already present it can simply be chosen for use in providing a set of input data). For example, an EAU may be provided (or selected) on the pelvis link to provide relative orientation measurements. At 230, the method 200 continues with initiating data collection for a set of joints while enforcing the kinematic constraint chosen at 210. The robot, for example, may be initially posed in a first position or pose (defined by a plurality of link positions and joint angles) with the soles of its two feet flat on the floor. At 240, measurements from the IMU are collected while in this first pose to facilitate determination of relative global orientations. At 250, angle measurements are collected from angle sensors (e.g., potentiometers) at each joint of a predefined set of joints (e.g., all the joints of the robot or some subset such as those in the legs or the like).

At 260, it is determined whether additional poses will be utilized in the calibration, with many implementations of the method 200 using numerous poses such as 30 to 50 or more poses to enhance accurate calibration. If yes, the method 200 continues at 265 with manually moving the robot into a next pose such as by moving a leg joint or link while retaining the kinematic constraint (e.g., keeping the feet flat on or in contact with the floor). Then, steps 240 and 250 are repeated to gather IMU and angle sensor input at the next pose. Step 260 is then again performed to determine if there are additional poses to be used in the calibration.

When no more poses is determined, the method 200 continues at 270 with solving the optimization problem, such as by minimizing the cost function, so as to determine the angle offsets for each joint in the predefined set of joints. Then, at 280, the method 200 continues with determining the calibrated value of each of the joint angles in the predefined set of joints using the offsets determined in step 270. This may involve adding the offset value to the measured angle provided by the angle sensor for each joint. This calibrated value can then be used in controlling the robot such as by setting joint torques to position the links by movement or operation of a number of the joints. The method 200 may continue at 230 with another calibration operation (e.g., kinematic calibration may be periodically repeated for a robot) or may end at 290 such as with the controller operating with the set of offsets to determine calibrated joint angles during further movement or operation of the force-controlled humanoid robot.

To test or prototype the kinematic calibration method (such as with robot 110 and method 200), a single IMU attached to the robot (i.e., the CMU Sarcos humanoid robot) on the pelvis link was used to measure its orientation (M=1). Because this orientation is not affected by any joint, only the offsets of the leg joints (N=14) were identified or determined in this test implementation. The four corners of each sole (e.g., 8 points in total) of the robot's feet were used to compute the height variance. The sample pose data were collected at a frequency of 500 Hz while the robot was hung from a gantry at several different heights and leg configurations.

Further, the robot was moved or manipulated (e.g., with its hydraulic pump turned off to inactivate the joint actuators) to place it in numerous poses during the data collection process (or time period). The data collection process resulted in eight motion sequences about 4 minutes in total length. Because the pose changes were achieved relatively slowly during data collection, a significant amount of data was down sampled. There is generally a balance with the number of poses utilized as fewer samples (as reasonable or possible for calibration) are desirable in minimizing the computation time.

Figure 3:
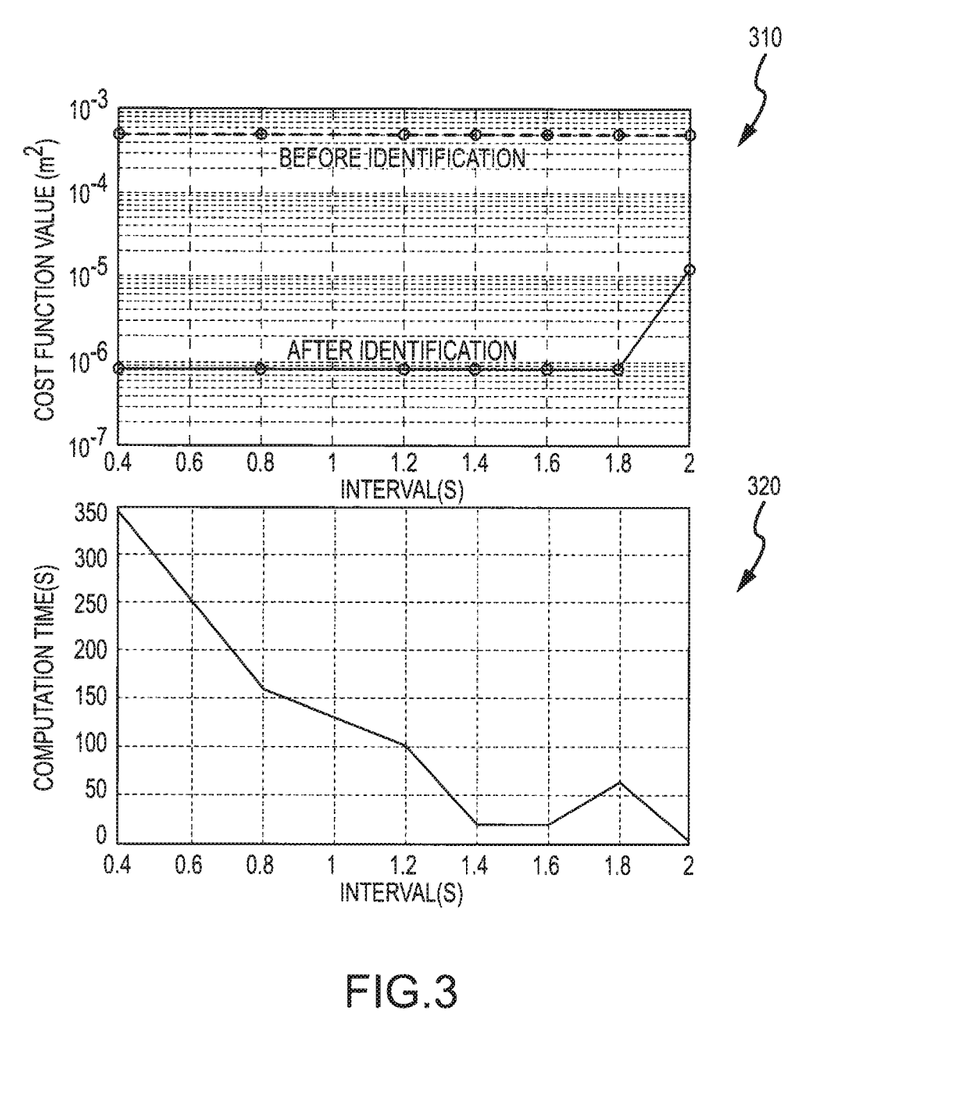
FIG. 3 provides two graphs showing cost function values and computation time using samples at various intervals.

FIG. 3 illustrates with graphs 310 and 320, respectively, how the cost function value and computation time relate to the interval of data used for the calibration in this test implementation. As shown, the cost function value is averaged over frames taken at 0.2 second intervals, regardless of the sample interval used for calibration. This result, therefore, includes cross-validations at samples not used for the optimization. As shown in FIG. 3, the cost function value after calibration maintains a reasonably small value up to about the 1.8 second interval, which takes only about 1 minute for computation with a typical computer/processor.

Figure 4:
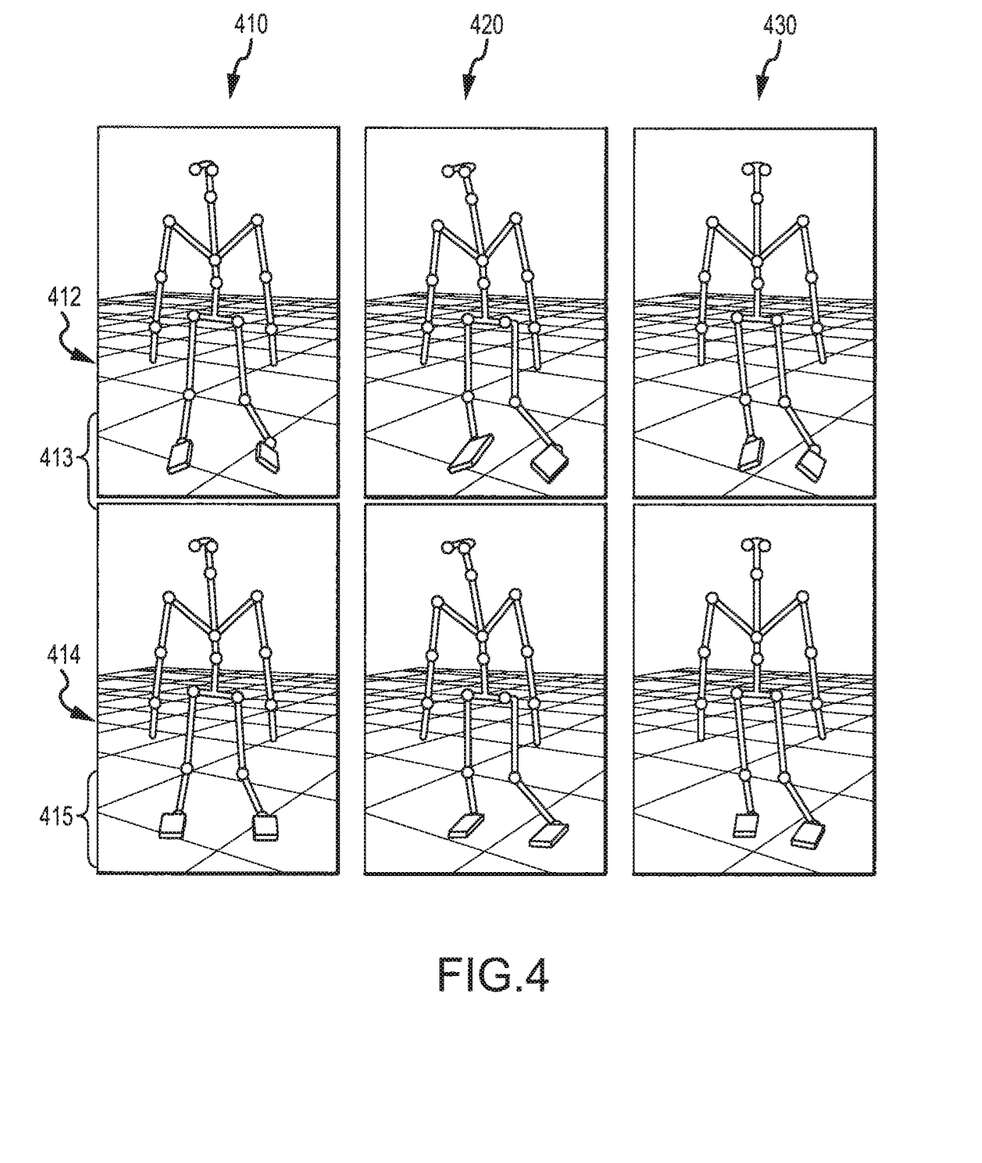
FIG. 4 illustrates schematically a humanoid robot utilized in a test run of the kinematic calibration method described herein showing control of the robot to position the robot in three different poses before and after completion of kinematic calibration.

FIG. 4 illustrates schematically a humanoid robot utilized in a test run of the kinematic calibration method. At 410, 420, 430, FIG. 4 shows a robot placed, via a controller, in three different poses before (top) and after calibration (bottom). For example, at 410, the robot is first controlled at 412 to take a particular pose, but, due to joint angle sensor inaccuracies (e.g., rotation/shifting), control of the feet does not place the feet flatly on the ground/floor (as shown at 413). In contrast, at 414, kinematic calibration has been completed and results in the feet of the robot to be flat (as shown at 415) for the same pose 410. Note, the root position (e.g., the pelvis link height) is fixed because this information is not available. However, it can be observed that the left and right feet are flat at the same height after the calibration in each pose 410, 420, 430 whereas this clearly was not the case before calibration. This fact was also verified by inspecting foot vertex heights (e.g., eight sole corners) at sample poses with the average height in each sample subtracted.

In addition to or as a modification to the flat feet in contact constraint, other kinematic constraints may be utilized during the kinematic calibration described herein. In such cases, it may then also be useful to replace the cost function to reflect use of this new constraint(s) (e.g., replace Eq. (5) above with a newly derived cost function). For example, the inventor has found it useful to implement a kinematic calibration method in which in addition to the flat feet in contact with the floor constraint a constraint is included that calls for the two feet of the robot to be aligned. Tests have shown that such an additional constraint can significantly improve the calibration results that can be achieved by the kinematic calibration module and the offsets it provides.

Figure 5:
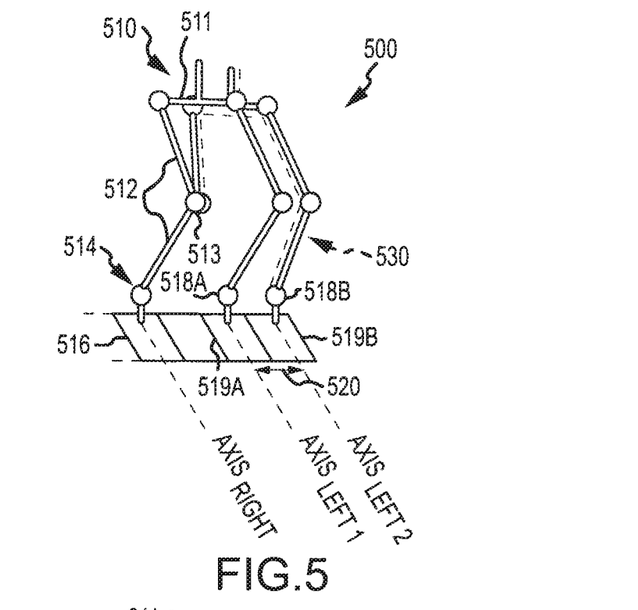
FIG. 5 is an illustration of a humanoid robot that is positioned to satisfy an aligned feet constraint with feet aligned parallel in a side-by-side manner.

This additional constraint may call for the two feet to be arranged to be aligned with the feet side-by-side as shown for the robot 500 of FIG. 5. As shown, the lower portion or leg portion 510 of the robot 500 is placed in a first position, including locations for a pelvis link 511, leg links 512, a right leg joint 513, a right ankle joint 514, a right foot 516, and also locations for a left ankle joint 518A and a left foot 519A. In this first position of leg portion 510, the feet 516, 519A are aligned side-by-side with central or longitudinal axes, Axis-$_{Right}$ and Axis$_{Left1}$, extending through the feet or soles 516, 519A being parallel to each other. The axes are also co-planar as the feet 516, 519A are positioned to concurrently satisfy the flat feet contact constraint (or the original kinematic constraint).

FIG. 5 also illustrates the leg or lower portion 530 of the robot 500 in a second position where the left foot 519B and ankle joint 518B have been moved 520 to a new position (new pose of robot 500) with the axis, Axis$_{Left2}$, of the left foot 519B still being parallel to the axis, $\text{Axis}_{Right}$, of the right foot 516. The configuration shown with robot 500 retains the feet in parallel with the toes and heels of the feet aligned. This may be achieved by use of a simple jig, by placing two long or elongate elements (e.g., boards) at the toe and heel sides of the feet 516, 519A prior to movement 520, or the like.

Figure 6:
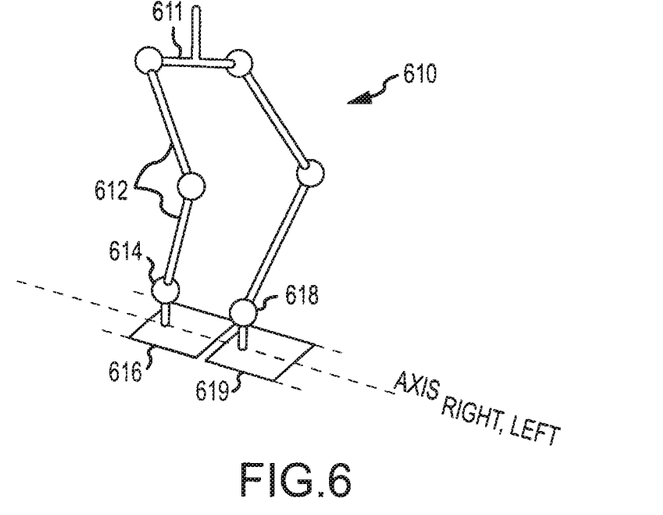
FIG. 6 illustrates a humanoid robot arranged to satisfy aligned feet in a manner differing from that of FIG. 5 with the feet aligned front and aft rather than side-by-side.

FIG. 6 illustrates a similar but somewhat differing additional constraint that may be utilized in combination with the flat feet and contact constraint. A lower or leg portion 610 of a humanoid robot is shown that includes a pelvis link 611, leg inks 612, right and left ankle joints 614, 618, and right and left feet (or planar bottom soles) 616, 619. The feet 616, 619 are shown to be aligned in the front/fore and rear/aft direction with coinciding central or longitudinal axes, $\text{Axis}_{Right}$ and $\text{Axis}_{Left}$. Again, this additional or second kinematic constraint is enforced concurrently with the original or first kinematic constraint that requires the feet 616, 619 be positioned to be flat and in contact with the same (a single) planar, horizontal support surface (e.g., the floor or ground), which causes the soles to remain coplanar, too.

Figure 7:
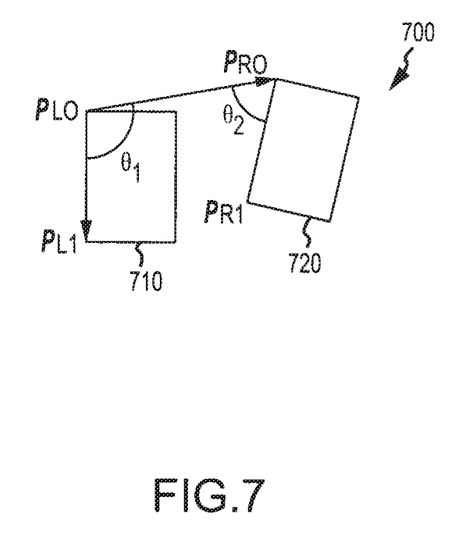
FIG. 7 illustrates a top block diagram of a pair of feet/soles for a humanoid robot showing parameters useful in computing a cost function for an aligned feet kinematic constraint.

With the addition of a new kinematic constraint, a cost function may be derived to address/include the aligned feet constraint and to replace the cost function of Eq. (5). FIG. 7 shows a top view 700 of a robot's feet 710, 720 projected onto a horizontal floor (or planar support platform). The rectangles 710, 720 represent the left and right feet, respectively. Two corresponding vertices may be chosen from each foot 710, 720 and denote their positions by $p_{*0}$ and $p_{*1}$, where $*=L$ for the left foot and $*=R$ for the right foot. The cost function derivation also utilizes the angles, $\theta_1$ and $\theta_2$, defined/shown in FIG. 7.

If the feet satisfy the aligned feet constraint, $\theta_1 = \pi/2$ and $\theta_2 = \theta/2$ hold, and hence, $\cos\theta_1 = 0$ and $\cos\theta_2 = 0$. With this in mind, the cost function may be chosen to be:

$$C_k = \cos^2\theta_1 + \cos^2\theta_2 \qquad \text{Eq. (6)}$$

as the cost function for aligned feet constraints. Using the positions of the foot vertices, $\cos\theta_1$ can be computed by (with the formulation for computing $\cos\theta_2$ being similar):

$$\cos\theta_1 = \frac{(p_{L1} - p_{L0})^T(p_{R0} - p_{L0})}{\|p_{L1} - p_{L0}\|\|p_{R0} - p_{L0}\|} \qquad \text{Eq. (7)}$$

As discussed with regard to the robot 110 of FIG. 1, dynamic calibration may also be used (with or without kinematic calibration) to calibrate a robot or its controls by providing accurate or more correct inertial parameters (such as mass or other dynamic parameters 136, 168 of each link 112 of the robot 110 with dynamic calibration module 158). Accurate inertial parameters are important for model-based control of a robot, and their identification or determination for robot manipulators has been actively studied by many in the robotics industry or research field. Prior methods typically have utilized the fact that the joint torques can be represented as a linear equation of the inertial parameters. In particular, the set of parameters that affect the dynamics and, therefore, are determinable with these prior methods are called "base parameters." Given the joint torque and motion data, the base parameters that give the minimum error can be obtained by the pseudo-inverse of the regressor.

In order to identify all base parameters reliably, the data should have enough excitation, and methods for optimizing the excitation have been developed in the past. With poor excitation, the regressor will be ill-conditioned, and the identification or determination of base parameters may result in physically inconsistent inertial parameters including negative mass for a link. Possible solutions for this problem have been tried by researchers including grouping and eliminating non-identifiable parameters using the singular values of the regressor or a statistical model and also included constraining the inertial parameters within the consistent parameter space.

Unfortunately, applying these prior dynamic calibration techniques to floating-base humanoid robots is not straightforward. One problematic issue is how best to realize accelerations that are large enough to perform reliable computations of inertial parameters while maintaining the robot's balance. Another practical issue is the complexity of the humanoid robot dynamics and additional codes that are required to perform computations of inertial parameters and to use the output/results of such computations as input for robot control. Computing the regressor usually requires reorganization of the rigid-body dynamics equation, which is difficult for complex mechanisms. Further, the computed base parameters have to be converted to the parameters used in the standard inverse dynamics formulation.

With these problems with prior techniques understood and in mind, the following description first presents a practical method for computing the regressor using only an inverse dynamics function that is usually available for model-based control. Then, the description presents two methods that directly compute physically consistent inertial parameters even with poor excitation. The first method involves considering only the major singular vectors of the regressor to obtain the least-square solution, and the second method involves applying a gradient-based method to solve an optimization problem with lower bounds on the mass parameters.

Experimental results have suggested that the first method can yield reasonable least-square solutions if an appropriate condition number threshold is used. The second method, though, has proven to work even with the original regressor and appears to give better cross-validation results. One of the differences with the second method and prior techniques is that the prior techniques represent a link by a set of point masses placed on its surface to obtain consistent parameters. In contrast, the described second method taught by the inventor does not use such a representation at least because the hydraulic hoses of the robot used to actuate joints typically run outside the link geometry in the robot's CAD model. Some prior efforts tried to identify inertial parameters of the human body (not robots). However, it would be easier to obtain good excitation in some of the prior techniques or applications because humans can do much more aggressive motions than humanoid robots. Because the inventor does not expect to obtain excitation adequate enough to compute the moments of inertia of the links, efforts have been focused upon computing or determining the mass and local center of mass (CoM) parameters and then use the CAD model to compute the link moments of inertia.

To address this problem with a lack of input data, the following problem formulation has been created by the inventor to facilitate dynamic calibration of a floating-base humanoid robot. The dynamics of humanoid robots with a floating base is described as:

$$M(\theta,\phi)\ddot{\theta} + c(\theta,\dot{\theta},\phi) = S^T\tau + J^T(\theta)f \qquad \text{Eq. (8)}$$

where $\theta$ is the generalized coordinates, $\phi$ is the N inertial parameters to be computed/identified. M is the joint-space inertia matrix, c is the centrifugal, Coriolis, and gravitational forces, $\tau$ is the active joint torques, J is the contact Jacobian matrix, f is the contact forces, and $S^T$ is the matrix to map joint torques to generalized forces.

In particular, if the robot has M degrees of freedom (DoF) and the first six elements of the generalized coordinates correspond to the six DoF of the floating base, $S^T$ has the form:

$$S^T = \begin{pmatrix} 0_{6 \times (M-6)} \\ 1_{(M-6) \times (M-6)} \end{pmatrix} \qquad \text{Eq. (9)}$$

where 0* and 1* represent the zero and identity matrix of appropriate sizes. In the rest of this description, the left-hand side of Eq. (8) is represented by F $(\theta, \dot{\theta}, \ddot{\theta}, \phi)$.

Assume that a K-frame long sequence of experimental data is collected or available that includes the joint angles, $\theta_k$, joint torques, $\tau_k$, and contact forces, $f_k$, at frame k (k=1, 2, ..., K). Using an inverse dynamics algorithm, F(*) can be computed from $\theta_k$ and its velocity and acceleration at frame k using:

$$F_k(\phi) = F(\theta_k, \dot{\theta}_k, \ddot{\theta}_k, \phi) \qquad \text{Eq. (10)}$$

It is known that $F_k(\phi)$ becomes a linear function of $\phi$. Note, that instead of the local CoM position of the i-th link $S_i$, $\phi$ should include the first moment of inertia $ms_i = (ms_{ix}\ ms_{iy}\ ms_{iz})^T = m_i s_i$ to make the equation linear (where $m_i$ is the mass).

Now, if $A_k$ is used to denote is coefficient matrix (regressor) at frame k:

$$F_k(\phi) = A_k \phi \qquad \text{Eq. (11)}$$

By concatenating Eq. (11) for all frames, the following equation is obtained:

$$\overline{F}(\phi) = \overline{A}\phi \qquad \text{Eq. (12)}$$

On the other hand, the right-hand side of Eq. (8) can be computed from the force measurements at frame k as:

$$\hat{F}_k = S^T \tau_k + J^T(\theta_k) f_k \qquad \text{Eq. (13)}$$

Then, concatenating Eq. (13) for all frames, the following equation is obtained:

$$\overline{F} = \overline{S}^T \overline{\tau} + \overline{J}^T \overline{f} \qquad \text{Eq. (14)}$$

The goal of the parameter computation process is to compute the parameters $\phi$ that satisfy the following equation:

$$\overline{A}\phi = \overline{F} \qquad \text{Eq. (15)}$$

However, it may be difficult to compute $\overline{F}$ due to sensor limitations. For example, joint torque measurement may not be available as is the case with most humanoid robots driven by electric motors. Also, some contact forces may be unavailable or less accurate due to limitations in the on-board force-torque sensors.

In general, $\overline{\tau}$ and $\overline{f}$ can be divided into available and unavailable components and formulate the optimization problem only using the available measurements. Specifically, $\overline{\tau}$ and $\overline{f}$ are divided into components whose measurements are available and unavailable, $\overline{\tau}_a$, $\overline{\tau}_u$ and $\overline{f}_a$, $\overline{f}_u$ respectively. Then, Eq. (14) can be rewritten as:

$$\overline{F} = (\overline{S}_a^T \overline{J}_a^T) \begin{pmatrix} \overline{\tau}_a \\ \overline{f}_a \end{pmatrix} + (\overline{S}_u^T \overline{J}_u^T) \begin{pmatrix} \overline{\tau}_u \\ \overline{f}_u \end{pmatrix} = \overline{H}_a^T \begin{pmatrix} \overline{\tau}_a \\ \overline{f}_a \end{pmatrix} + \overline{H}_u^T \begin{pmatrix} \overline{\tau}_u \\ \overline{f}_u \end{pmatrix} \qquad \text{Eq. (16)}$$

$\overline{N}_u$ is used to represent the null space basis of $\overline{H}_u^T$. Then, by left-multiplying $\overline{N}_u$ to both sides of Eq. (16) the following equation is obtained:

$$\overline{N}_u \overline{F} = \overline{N}_u \overline{S}_a^T \overline{\tau}_a + \overline{N}_u \overline{J}_a^T \overline{f}_a \qquad \text{Eq. (17)}$$

because $\overline{N}_u \overline{H}_u^T = 0$. Next, both sides of Eq. (15) are multiplied by $\underline{N}_u$ to obtain:

$$\overline{A}_N \phi = \overline{F}_N \qquad \text{Eq. (18)}$$

where $\overline{A}_N = \overline{N}_u \overline{A}$ and $\overline{F}_N = \overline{N}_u \overline{F}$. Because of Eq. (17), Eq. (18) only includes the measurable forces.

The base parameters are generally a linear combination of a subset of the standard inertial parameters, $\phi$. Therefore, computing the regressor requires the symbolic representation of the robot dynamics and a dedicated code/software routine for evaluating the symbolic equations with given motion data. These processes can be difficult for complex mechanisms.

Hence, the inventor chose to use formulation with standard inertial parameters instead of the base parameters. A drawback is that because not all parameters are identifiable/determinable in principle it may be difficult to obtain physically consistent parameters even with more optimal excitation. However, the inventor's approach allows the exploration of the following two advantages: (1) the regressor can be computed easily using an inverse dynamics function and (2) the inertial parameters can be obtained directly.

Instead of solving Eq. (18), a set of inertial parameters are computed that are as close as possible to known nominal parameters, $\phi_0$, which can be obtained from the robot's CAD model (for example), Accordingly, the inertial parameters, $\phi$, can be divided as $\phi = \phi_0 + \Delta\phi$. Also, Eq. (18) does not have an exact solution in most cases due to measurement noise. Taking the above two points into account, the problem may be stated as attempting to find a value of $\Delta\phi$ that minimizes the following equation:

$$Z = \|\Delta \overline{F}_N - \overline{A}_N \Delta\phi\|^2 \qquad \text{Eq. (19)}$$

where $\Delta \overline{F} = \overline{F}_N - \overline{A}_N \phi_0$.

One unique feature of the dynamics calibration method taught herein (and implemented by module 158 of robot 110 of FIG. 1) is how minimizing of Eq. (19) is achieved to provide the inertial parameters, which can then be used in controlling the robot. A straightforward method to obtain $\Delta\phi$ is to use the pseudo-inverse of $\overline{A}_N$ given as:

$$\overline{A}_N^{\#} = (\overline{A}_N^T \overline{A}_N)^{-1} \overline{A}_N^T \qquad \text{Eq. (20)}$$

which gives the minimum-norm that minimizes Eq. (19) as $\Delta\phi = \overline{A}_N^{\#} \Delta\overline{F}_N$. However, if the condition number of $\overline{A}_N$ is large, the resulting inertial parameters, $\phi_0 + \Delta\phi$, may include inconsistent values.

A workaround for this problem is to omit small singular values of $\overline{A}_N$ as may be defined as being less than a predefined threshold value. The singular-value decomposition of $\overline{A}_N$ can be set to:

$$\overline{A}_N = U \Sigma V^T \qquad \text{Eq. (21)}$$

where U and V are orthogonal matrices and $\Sigma$ is a diagonal matrix whose diagonal elements are the singular values of $\overline{A}_N$, $\sigma_i$ (i=1, 2, ..., N, $\sigma_1 \geq \sigma_2 \geq ... \geq \sigma_N$). The pseudo-inverse of $\overline{A}_N$ can then be written as:

$$\overline{A}_N^{\#} = V \Sigma^{-1} U^T \qquad \text{Eq. (22):}$$

Now, instead of the regular $\Sigma^{-1} = \text{diag}\{1/\sigma_i\}$, we use $\hat{\Sigma}^{-1}$ whose elements are given by:

$$\hat{\Sigma}^{-1}_{ii} = \begin{cases} 1/\sigma_i & \text{if } \sigma_1/\sigma_i < C_{max} \\ 0 & \text{otherwise} \end{cases} \qquad \text{Eq. (23)}$$

where $c_{max}$ is a user-defined maximum condition number. The above method of minimizing Eq. (19) may be referred to as the least-square method.

Another way to minimize Eq. (19) is to apply gradient-based numerical optimization using $\Delta\phi=0$ as the initial guess. The advantage of this method is that the lower and/or upper bounds for each parameter can be explicitly set. In one implementation, a conjugate-gradient method is used with lower bounds set to prevent negative mass parameters. Also, $\overline{A}_N$ can be replaced by:

$$\overline{A}'_N = U\hat{\Sigma}V^T \quad \text{Eq. (24)}$$

where $\hat{\Sigma}$ is a diagonal matrix whose elements are given by the following:

$$\sum_{ii} \hat{} = \begin{cases} \sigma_i & \text{if } \sigma_1/\sigma_i < C_{max} \\ 0 & \text{otherwise} \end{cases} \quad \text{Eq. (25)}$$

This minimizing method may be referred to as the gradient-based method.

Computing the regressor $A_k$ in the formulation is relatively trivial because the standard inertial parameters are utilized rather than the base parameters. The following describes a method for computing the i-th column of $A_k$, $a_{ki}$. First, the generalized forces $F_k^0$ are computed with the nominal inertial parameters using the inverse dynamics function provided by:

$$F_k^0 = F(\theta_k, \dot{\theta}_k, \ddot{\theta}_k, \phi_0) \quad \text{Eq. (26)}$$

Next, a unit change can be made to the i-th element of $\phi_0$ to obtain $\phi'_i$ and then the new generalized forces can be computed that correspond to the new inertial parameters with $F_k^i = F(\theta_k, \dot{\theta}_k, \ddot{\theta}_k, \phi_i)$ Further, $a_{ki}$ can be computed by the equation:

$$a_{ki} = F_k^i - F_k^0 \quad \text{Eq. (27)}$$

Now, a description can be provided on how to modify the mass and local CoM parameters according to a unit change to the i-th element of $\phi$. If the i-th element of $\phi$ corresponds to the mass of link j, the inertial parameters of link j can be modified as:

$$m_j \leftarrow m_j + 1 \quad \text{Eq. (28)}$$

$$s_j \rightarrow \frac{m_j}{m_j+1} sj \quad \text{Eq. (29)}$$

Where $m_j$ has been increased by a unit mass but $ms_j$ remains the same. If the i-th element of $\phi$ corresponds to $ms_j^*$(*=x, y, z), the CoM can be modified as:

$$s_{j*} \leftarrow s_{j*} + \frac{1}{m_j} \quad \text{Eq. (30)}$$

so that $ms_j^*$ increases by 1.

The inventor performed a number of experiments or testing of the above-described dynamic calibration method to collect experiment results that verified the usefulness of this new calibration method. Three sequences of data were collected using the robot's controller, where the robot was controlled to track a human motion capture sequence while maintaining balance. One sequence was used for computation or identification of inertial parameters while the other two sequences were used for cross validation. Each sequence was about 30 seconds in length or duration. During the motion, no contact state change occurred and both feet were kept in flat contact with the ground/floor.

The motion contained significant amounts of upper body movement while the lower body was relatively stationary, with small amounts of motion (mostly due to the errors in the dynamics model used for the experiment). The arm joints were controlled by a proportional-derivative position controller. A model-based controller for maintaining balance and tracking a reference motion was used to compute the joint torque commands of other joints.

During the experiment, the joint angles, joint torques, and ground contact forces were measured. The root orientation was measured by an IMU attached to the pelvis link. The root position was estimated using the reference motion and leg joint angles. Although each joint had a joint torque sensor, the joint torque data for position-controlled joints was not obtainable due to the specification of the control software used in the experiment. Also, the horizontal force components of the six-axis force-torque sensors in the robot's ankles were not well calibrated during the experiment.

The original data was recorded at 2 millisecond intervals and down sampled to 100 millisecond intervals for the computation or identification of inertial parameters. To compute joint velocities and accelerations, the joint angle measurements were interpolated by piece-wise third order polynomials whose coefficients were determined considering 125 data points before and after each frame. This interpolation, therefore, also serves as a low-pass filter without delay.

The following parameter sets were compared for identification or computation. In the first parameter set for individual links (L), mass and local CoM parameters of individual links were computed or identified. In the second parameter set for individual links with symmetry constraints (LS), mass and local CoM parameters of the links on the left side of the robot were computed, with the links on the right side assumed to have the same parameters with mirroring. The cost function values (Eq. (19)) obtained using the original inertial parameters (obtained from CAD data) were in the range of $2.11\times10^7$ to $2.29\times10^7$ for the three motions of the experiment.

The following observation can be made from the results of the experiment with the dynamic calibration method. First, small singular values should be omitted to obtain reasonable results using pseudo-inverse, while the gradient-based method gives consistent results regardless of the value of $c_{max}$. Second, enforcing symmetry generally gives better cross-validation results with slightly worse direct-validation results. Third, in most cases where both pseudo-inverse and gradient-based methods give reasonable results, the gradient-based method may give significantly better cross-validation results, although the direct-validation results are similar.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method for calibrating a legged robot with force-controlled joints, comprising:
    while moving the legged robot into a plurality of poses while enforcing a kinematic constraint, collecting and storing in memory with a processor a set of angle measurements for a set of joints of the legged robot; and with the processor running a kinematic calibration module, determining an angular offset for each of the joints in the set of joints based on processing of the set of angle measurements for the set of joints of the legged robot, wherein the legged robot is a biped with two legs and two feet and wherein the kinematic constraint comprises maintaining soles of the two feet flat and in contact with a horizontal, planar support surface.

2. The method of claim 1, further including during the moving collecting relative orientation data at each of the poses from an inertial movement unit (IMU) mounted on a link of the legged robot, wherein the determining of the angular offset for each of the joints is based on the collected relative orientation data.

3. The method of claim 2, wherein the angle measurements are provided by a joint angle sensor mounted proximate to each of the joints in the set of joints and the IMU is mounted on a pelvis link of the legged robot.

4. The method of claim 1, wherein the angular offsets determining includes minimizing a cost function defined based on link orientations and the kinematic constraint.

5. The method of claim 1, wherein the kinematic constraint further includes retaining the two feet in an aligned configuration.

6. The method of claim 5, wherein the aligned configuration includes side-by-side, parallel positions and fore and aft positions of the two feet.

7. The method of claim 1, further comprising computing a set of inertial parameters for the legged robot.

8. The method of claim 7, wherein the computing includes computing a number of standard inertial parameters to provide at least a number of the set of inertial parameters for the legged robot.

9. The method of claim 7, wherein the computing of the inertial parameters comprises omitting singular values of a regressor below a predefined threshold value when performing a least-square minimizing process.

10. The method of claim 7, wherein the computing of the inertial parameters comprises optimizing using a gradient-based process.

11. A robot with kinematic calibration, comprising:
a body comprising a plurality of links and force-controlled joints, wherein the links include a pelvis link and the joints include a pair of ankle joints each positioning a foot;
an angle sensor associated with each of the joints;
an inertial measurement unit (IMU) provided on the pelvis link; and
a processor running a kinematic calibration module,
wherein the kinematic calibration module processes angle measurements provided by the angle sensors and data generated by the IMU, wherein the angle measurements and IMU data is collected during movement of the body through a number of poses,
wherein the feet are flat and in contact with a planar support surface during each of the poses to enforce a kinematic constraint during data collection,
wherein the kinematic calibration determines an angle offset value for each of the joints based on the IMU data and the kinematic constraint, and
wherein the kinematic constraint further includes aligning the feet such that the feet are side-by-side and parallel or arranged toe-to-heel during each of the poses.

12. The robot of claim 11, further comprising a dynamic calibration module computing inertial parameters for the humanoid robot and a robot controller generating joint torques for the joints based on the computed inertial parameters.

13. The robot of claim 12, wherein the computing of the inertial parameters includes computing one or more standard inertial parameters and further wherein the computing of the inertial parameters comprises omitting singular values of a regressor below a predefined threshold value when performing a least-square minimizing process.

14. The robot of claim 12, wherein the computing of the inertial parameters includes optimizing using a gradient-based process.

15. A system for calibrating a humanoid robot, comprising:
memory storing angle measurements from a set of joints of a humanoid robot, the angle measurements being provided by angle measurement sensors mounted on the humanoid robot operating during movement of the humanoid robot through a plurality of poses while enforcing a kinematic constraint, wherein the humanoid robot has two feet and the kinematic constraint comprises maintaining soles of the feet in contact with a horizontal planar surface;
memory storing data output from an IMU mounted on the humanoid robot, the IMU data being output from the IMU being collected during the movement of the humanoid robot; and
a processor performing kinematic calibration by processing the angle measurements and the IMU data to identify angle offset values for each of the joints.

16. The system of claim 15, wherein the IMU is mounted upon a pelvis link of the humanoid robot and the kinematic calibration includes determining relative orientations using the IMU data.

17. The system of claim 15, wherein the processor further performs dynamic calibration of the humanoid robot, the dynamic calibration including computing a set of inertial parameters for the humanoid robot with one of least-square minimizing and a gradient-based minimizing.

18. The system of claim 15, further including a robot controller determining calibrated joint angles based on the angle offset values and additional angle measurement obtained from the angle sensors, wherein the robot controller further operates to generate joint torques to operate the joints using the calibrated joint angles.

19. The system of claim 15, wherein the kinematic constraint further comprises aligning the feet to be side-by-side and parallel or to have longitudinal axes of the feet coincide.

* * * * *